US011241140B2

(12) United States Patent
Jung et al.

(10) Patent No.: US 11,241,140 B2
(45) Date of Patent: Feb. 8, 2022

(54) DISH WASHER

(71) Applicant: LG Electronics Inc., Seoul (KR)

(72) Inventors: Changyoon Jung, Seoul (KR); Sangheon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 16/696,589

(22) Filed: Nov. 26, 2019

(65) Prior Publication Data

US 2020/0163531 A1 May 28, 2020

(30) Foreign Application Priority Data

Nov. 27, 2018 (KR) .......................... 10-2018-0148956

(51) Int. Cl.
*A47L 15/22* (2006.01)
*A47L 15/42* (2006.01)
*A47L 15/48* (2006.01)

(52) U.S. Cl.
CPC ............. *A47L 15/483* (2013.01); *A47L 15/22* (2013.01); *A47L 15/4219* (2013.01); *A47L 15/4278* (2013.01); *A47L 15/4287* (2013.01); *A47L 15/4291* (2013.01); *A47L 15/48* (2013.01); *Y02B 30/52* (2013.01); *Y02B 40/00* (2013.01)

(58) Field of Classification Search
CPC .. A47L 15/22; A47L 15/4219; A47L 15/4278; A47L 15/4287; A47L 15/4291; A47L 15/48; A47L 15/481; Y02B 30/52; Y02B 40/00
USPC ........................... 134/56 D, 57 D, 58 D, 107
See application file for complete search history.

(56) References Cited

U.S. PATENT DOCUMENTS

2015/0257627 A1\* 9/2015 Park ...................... A47L 15/483
34/72

FOREIGN PATENT DOCUMENTS

KR 20150108188 9/2015

\* cited by examiner

*Primary Examiner* — Levon J Shahinian
(74) *Attorney, Agent, or Firm* — Fish & Richardson P.C.

(57) ABSTRACT

A dish washer includes a washing tank having an accommodation space for storing dishes therein; an injection arm disposed inside the washing tank, and provided with a plurality of nozzles to selectively inject washing water and air to the dishes according to a washing operation and a drying operation; a duct unit that defines a passage of the air to be supplied to the injection arm; a suction fan provided inside the duct unit to suction the air and supply the air to the injection arm; and an air heating element that heats the air to be supplied to the injection arm, wherein the injection arm includes a partition wall that partitions a washing water passage and an air passage therein.

20 Claims, 6 Drawing Sheets

DISH WASHER

CROSS-REFERENCE TO RELATED APPLICATION

Pursuant to 35 U.S.C. § 119(a), this application claims the benefit of an earlier filing date of and the right of priority to Korean Patent Application No. 10-2018-0148956, filed on Nov. 27, 2018 the contents of which are incorporated by reference herein in its entirety.

BACKGROUND

1. Technical Field

The present disclosure relates to a dish washer that heats washing water using a heat pump.

2. Description of the Related Art

A dish washer is a device that automatically washes and dries dishes using detergent or the like.

The dish washer may be configured to perform a process of washing, rinsing and drying dishes placed inside a main body thereof.

The dish washer may heat washing water using an electric heater provided in the main body.

However, the electric heater used in the dish washer has a problem that consumes a lot of power when washing and drying dishes.

In addition, high temperature washing water heated subsequent to the completion of washing is discharged to an outside of the dish washer, and thus there is a problem that energy loss occurs.

In order to solve the foregoing problems, a dish washer capable of reducing energy consumption by heating washing water using a heat pump has been developed.

Prior art document KR 10-2015-0108188 A (published Sep. 25, 2015) discloses a household appliance (dish washer) having a drying device. The dish washer in the prior art includes a heat pump system that suctions air through a suction port at an upper portion of a washing tank to heat the suctioned air using heat discharged from a condenser, and dries dishes by discharging the heated hot air into the washing tank through the discharge port disposed at a lower side of the washing tank.

However, the dish washer in the prior art is provided only with an injection nozzle for injecting washing water into the washing tank, and is not provided with an injection nozzle for injecting air, and thus there is a limit in improving the drying performance by transferring hot air to dishes only by natural convection inside the washing tank.

Therefore, in order to increase the drying performance, a nozzle for directly injecting air into dishes needs to be provided inside the washing tank.

However, when a washing water injection nozzle and an air injection nozzle are separately disposed inside the washing tank, there is a problem in that a size of the dish washer is enlarged.

SUMMARY

The present disclosure has been made to solve the problems in the related art, and an aspect of the present disclosure is to provide a dish washer in which a washing water passage for injecting washing water into an injection arm and an air passage for injecting air are separately partitioned by a partition wall so as to inject washing water and air through the injection arm.

In addition, another aspect of the present disclosure is to provide a dish washer capable of using a large space of a washing tank and contributing to the miniaturization of the washer by separately providing a washing water passage and an air passage inside one injection arm.

In order to achieve the foregoing objectives, a dish washer according to an example of the present disclosure may include a washing tank having an accommodation space for storing dishes therein; an injection arm disposed inside the washing tank, and provided with a plurality of nozzles to selectively inject washing water and air to the dishes according to a washing stroke and a drying stroke; a duct unit that defines a passage of the air to be supplied to the injection arm; a suction fan provided inside the duct unit to suction the air and supply the air to the injection arm; and an air heating element that heats the air to be supplied to the injection arm, wherein the injection arm includes a partition wall that partitions a washing water passage and an air passage therein.

According to an example associated with the present disclosure, the partition wall may extend horizontally along a length direction inside the injection arm, and the washing water passage may be disposed above the partition wall, the air passage may be disposed below the partition wall.

According to an example associated with the present disclosure, the plurality of nozzles may include a plurality of first nozzles arranged to communicate with the washing water passage and spaced apart in a length direction at an upper portion of the injection arm to inject the washing water during a washing stroke; and a plurality of second nozzles arranged to communicate with the air passage and spaced apart in a length direction at a lower portion of the injection arm to inject the air in a direction opposite to an injection direction of the washing water during a drying stroke.

According to an example associated with the present disclosure, the dish washer may further include a circulation passage that defines a passage for circulating the washing water into the injection arm; a circulation pump that circulates the washing water along the circulation passage; a washing water delivery pipe that connects the circulation passage and the washing water passage to deliver the washing water to the washing water passage; and an air delivery pipe, one side of which is connected to the duct unit, and the other side of which is connected to the air passage through the washing water delivery pipe to deliver the air to the air passage.

According to an example associated with the present disclosure, the injection arm may further include a washing water inlet pipe disposed at the center of the injection arm and connected to the washing water delivery pipe; and an air inlet port disposed to protrude from the center of the partition wall to an inner side of the washing water inlet pipe and connected to the air delivery pipe.

According to an example associated with the present disclosure, the injection arm may include a plurality of first injection arm portions that define the washing water passage; a plurality of second injection arm portions that extend in a direction crossing the plurality of first injection arm portions to define the air passage; and a central connection portion connecting the inner end portions of the plurality of first injection arm portions and the plurality of second injection arm portions, respectively.

According to an example associated with the present disclosure, the partition wall may include a central partition wall portion that horizontally extends to an inside of the central connection portion; a plurality of boundary partition wall portions that extend from the central partition wall portion between the first injection arm and the second injection arm to partition the washing water passage and the air passage; a first inclined partition wall portion disposed to be inclined downward from the central partition wall portion to an inner surface of the first injection arm to communicate with the washing water passage; and a second inclined partition wall portion disposed to be inclined upward from the central partition wall portion to an inner surface of the second injection arm to communicate with the air passage.

According to an example associated with the present disclosure, the dish washer may further include a washing water inlet pipe disposed at the central connection portion and connected to a washing water delivery pipe that delivers the washing water to the washing water passage; and an air inlet port disposed to protrude from the central partition wall portion to an inner side of the washing water inlet pipe and connected to an air delivery pipe that delivers the air to the air passage.

According to an example associated with the present disclosure, a plurality of the injection arms may be arranged to be spaced apart from one another in a vertical direction inside the washing tank.

According to an example associated with the present disclosure, each of the plurality of injection arms may be rotatably mounted, and rotated by an injection pressure of the washing water or the air.

According to an example associated with the present disclosure, the air heating element may be a heat pump system, and the heat pump system may include a compressor that circulates refrigerant; a condenser provided inside the duct unit to discharge the heat of the refrigerant compressed in the compressor to the air; an expansion apparatus that expands refrigerant condensed in the condenser; and an evaporator that evaporates refrigerant received from the expansion apparatus to deliver the refrigerant to the compressor.

According to another example associated with the present disclosure, the air heating element may be an electric heater provided inside the duct unit.

According to still another example associated with the present disclosure, the air heating element may include a condenser provided inside the duct unit; and an electric heater provided inside the duct unit to further selectively heat air heated from the condenser.

According to an example associated with the present disclosure, the dish washer may further include a heat exchange chamber that accommodates the evaporator and stores water therein to exchange heat between the water and the evaporator.

The effects of a dish washer having a heat pump according to the present disclosure will be described as follows.

First, a condenser and a suction fan may be provided inside a duct unit, and the suction fan may suction air from a washing tank into the duct unit and the condenser may heats the suctioned air, thereby saving energy compared to heating air using an electric heater in the related art.

Second, a heat pump may operate prior to a drying stroke to preheat a refrigerant temperature of the condenser to shorten the time for increasing the refrigerant temperature of the condenser during the drying stroke, thereby reducing the drying time of air.

Third, hot air may be supplied into an injection arm through an air delivery pipe, and injected into dishes through a nozzle of the injection arm, and hot air with more heat may be quickly delivered than hot air being supplied to the dishes by natural convection in the related art, thereby improving the drying performance.

Fourth, a washing water passage and an air passage may be separated into upper and lower portions by a partition wall inside one injection arm to divide washing water nozzles and air nozzles separately on the washing water passage and the air passage, respectively, and the internal passages of the injection arm may be structurally divided into the washing water passage and the air passage without dividing the washing water passage and the air passage using an additional valve device, thereby simplifying the internal structure of the injection arm, and reducing the size of the injection arm.

Fifth, an air inlet port protruding from a partition wall inside a central portion of the injection arm may be disposed concentrically at an inner side of a washing water inlet pipe, but an air delivery pipe may be directly connected to the air inlet port through a washing water delivery pipe, and air may be injected onto dishes through a plurality of second nozzles while flowing into the air inlet port along the air delivery pipe, and moving along the air passage. Moreover, washing water may be injected onto dishes through a plurality of first nozzles while flowing in through a washing water inlet pipe along a washing water delivery pipe, and moving along the washing water passage.

Sixth, the injection arm may be rotated by an injection pressure of air injected through second nozzles to generate a circulation flow of air even without an additional circulation fan inside the washing tank, thereby actively exchanging heat between hot air and water on dishes.

Seventh, an evaporator may be provided at an inlet side of the duct unit connected to a suction port of the washing tank, and the evaporator may cool wet steam by absorbing heat from the wet steam inside the washing tank, thereby cooling moisture.

DETAILED DESCRIPTION OF THE EMBODIMENTS

Figure 1:
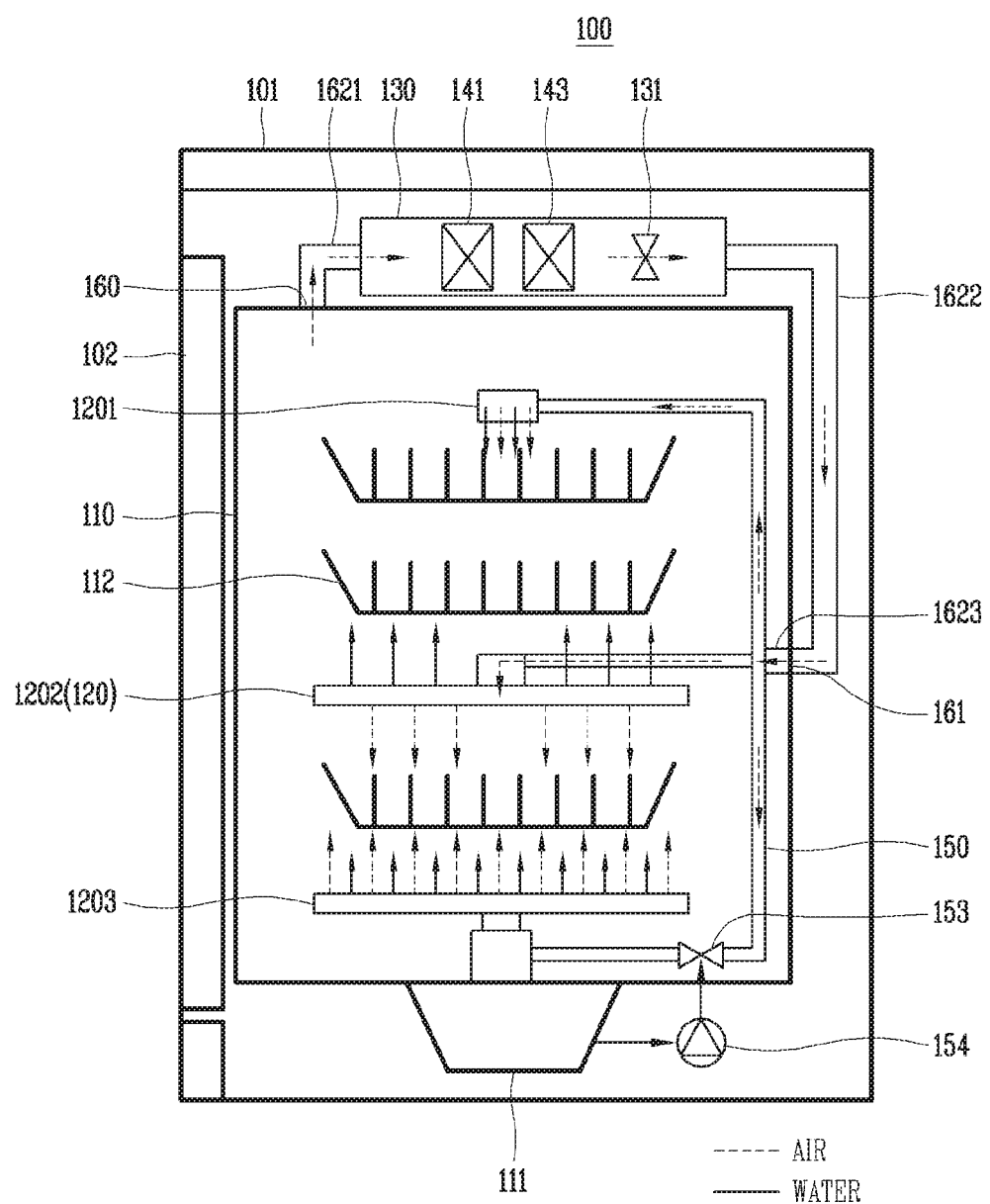
FIG. 1 is a conceptual view showing a dish washer according to a first embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present disclosure. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Figure 2:
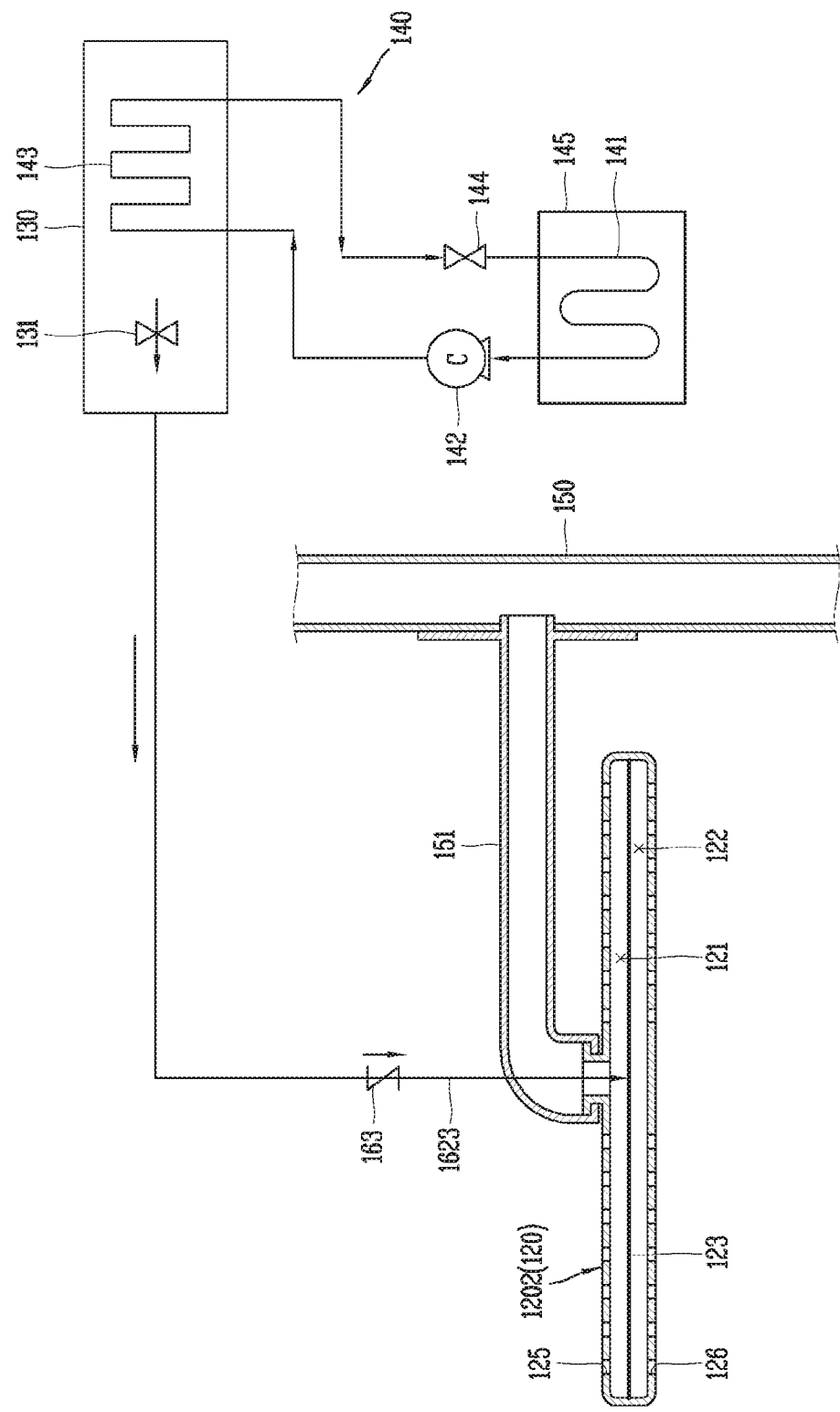
FIG. 2 is a conceptual view showing a state in which an air passage and a washing water passage are spaced apart in a vertical direction inside an injection arm according to an embodiment in FIG. 1.
Figure 3:
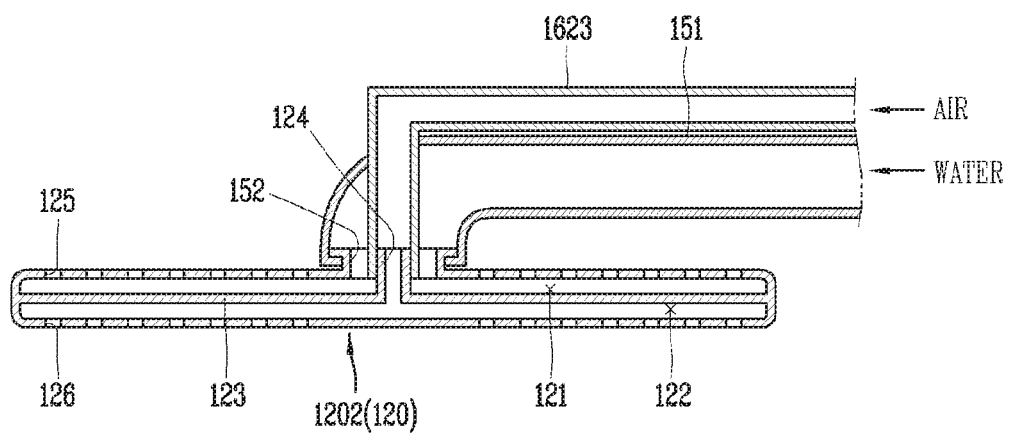
FIG. 3 is a conceptual view showing a structure in which an air delivery pipe and a washing water delivery pipe are connected to the air passage and the washing water passage, respectively, in FIG. 2.

FIG. 1 is a conceptual view showing a dish washer 100 according to a first embodiment of the present disclosure, and FIG. 2 is a conceptual view showing a state in which an air passage 122 and a washing water passage 121 are spaced apart in a vertical direction inside an injection arm 120 according to an embodiment in FIG. 1, and FIG. 3 is a conceptual view showing a structure in which an air delivery pipe and a washing water delivery pipe 151 are connected to the air passage 122 and the washing water passage 121, respectively, in FIG. 2.

The dish washer 100 according to the present disclosure may include a cabinet 101, a washing tank 110, an injection arm 120, a duct unit 130, a heat pump system 140, and the like.

The cabinet 101 may define an appearance of the dish washer 100. An accommodation space may be defined in the cabinet 101.

An inlet port is disposed at a front side of the cabinet 101 to put dishes or the like therein.

A door 102 may be rotatably hinge-coupled to a front side of the cabinet 101 to open and close an inlet port.

The washing tank 110 may be provided in the cabinet 101. An accommodation space for storing dishes may be disposed inside the washing tank 110. An opening portion may be disposed at a front side of the washing tank 110 to correspond to the inlet port.

A gasket is disposed along a rear edge of the door 102, and the gasket may be configured to seal washing water inside the washing tub 110 from leaking into an inner space of the cabinet 101.

A sump 111 may be recessed on a bottom surface of the washing tank 110. Washing water may be collected in the sump 111.

A plurality of racks 112 may be provided in the washing tank 110 to put dishes thereon. The plurality of racks 112 may be configured to allow washing water or air to enter and exit the racks 112, and the washing water or air may be injected onto dishes placed on the racks 112.

The plurality of injection arms 120 may be spaced apart in a vertical direction inside the washing tank 110. Each of the plurality of injection arms 120 may include a top injection arm 1201, an upper injection arm 1202, and a lower injection arm 1203.

Each of the plurality of spray arms 120 may extend horizontally. The washing water passage 121 and the air passage 122 may be provided inside the plurality of injection arms 120. The washing water passage 121 and the air passage 122 may be partitioned by a partition wall 123.

The partition wall 123 may extend horizontally in a length direction inside the injection arm 120. The washing water passage 121 may be disposed above the partition wall 123, and the air passage 122 may be disposed below the partition wall 123.

Each of the plurality of injection arms 120 includes a plurality of nozzles 125,126.

A plurality of nozzles 125, 126 may include a plurality of first nozzles 125 for injecting washing water and a plurality of second nozzles 126 for injecting air. The plurality of first nozzles 125 may be spaced apart one another in a length direction on an upper surface of the injection arm 120, and each of the plurality of first nozzles 125 may be arranged in a penetrating manner in a thickness direction so as to communicate with the washing water passage 121.

The plurality of second nozzles 126 may be spaced apart one another in a length direction on a lower surface of the injection arm 120, and each of the plurality of second nozzles 126 may be arranged in a penetrating manner in a thickness direction so as to communicate with the air passage 122.

Each of the plurality of injection arms 120 is spaced apart from the washing water passage 121 and the air passage 122 by the partition wall 123, and the washing water passage 121 and the air passage 122 may be arranged in a thickness direction of the partition wall 123 to overlap upper and lower portions thereof.

However, upper injection arms 1202 may be arranged on upper and lower surfaces of the plurality of first nozzles 125 and the plurality of second nozzles 126 facing each other in a vertical direction, respectively.

For the top injection arm 1201, the plurality of first nozzles 125 and the plurality of second nozzles 126 may be arranged on the lower surfaces of the injection arms 120, respectively, in the same direction.

For the lower injection arm 1203, the plurality of first nozzles 125 and the plurality of second nozzles 126 may be arranged on the upper surfaces of the injection arms 120, respectively, in the same direction.

In case of the top injection arm 1201 and the lower injection arm 1203, the plurality of first nozzles 125 and the plurality of second nozzles 126 may be alternately arranged along a length direction of the injection arm 120. The plurality of second nozzles 126 may extend from the partition wall 123 to pass through the washing water passage 121 in a vertical direction, and a lower end of the second nozzle 126 may be connected in communication with the air passage 122, and an upper end of the second nozzle 126 may be connected in communication with an inner space of the washing tank 110, and thus air may be injected to dishes without being leaked from the air passage 122 through the washing water passage 121 to the washing water passage 121.

A washing water circulation pipe 150 may be configured to connect the sump 111 and the plurality of injection arms 120 to circulate washing water. One side of the washing water circulation pipe 150 is connected in communication with the sump 111, and the other side of the washing water circulation pipe 150 is branched into a plurality of injection arms 120 to be connected in communication with the plurality of injection arms 120.

A three-way valve 153 may be provided at a branch point of the other side of the washing water circulation pipe 150, and washing water may move to at least one or more of the plurality of injection arms 120 through the three-way valve 153.

A circulation pump 154 may be configured to circulate washing water from the sump 111 to the plurality of injection arms 120 along the washing water circulation pipe 150.

The duct unit 130 may be disposed at an upper portion of the washing tank 110. The duct unit 130 may define a passage for the movement of air. One side of the duct unit 130 may be connected in communication with the upper portion of the washing tank 110, and the other side of the duct unit 130 may be connected in communication with the injection arm 120.

A suction port 160 may be disposed at an upper portion of the washing tank 110, and a discharge port 161 may be disposed at one side on a rear surface of the washing tank 110.

An air circulation pipe 162 may include a first air circulation pipe 1621 through a third air circulation pipe 1623.

The first air circulation pipe 1621 may be configured to connect between the suction port 160 of the washing tank 110 and one side (inlet) of the duct unit 130. The second air circulation pipe 1622 may be configured to connect between the other side (outlet) of the duct unit 130 and the discharge port 161 of the washing tank 110.

The third air circulation pipe 1623 may be configured to connect the discharge port 161 of the washing tank 110 and the injection arm 120 to move air from the duct unit 130 to the injection arm 120. The second air circulation pipe 1622 and the third air circulation pipe 1623 may be referred to as an air delivery pipe by connecting the duct unit 130 and the injection arm 120.

A suction fan 131 may be provided inside the duct unit 130 to suction air inside the washing tank 110 into the duct unit 130. The suction fan 131 may provide circulation power to the air to allow the air to be circulated to the injection arm 120 along the air circulation pipe 162.

An air heating element may be provided inside the duct unit 130. The air heating element may be composed of a heat pump system 140 or an electric heater, or both the heat pump system 140 and the electric heater may be applied thereto.

In the present embodiment, a configuration to which the heat pump system 140 is applied.

The heat pump system 140 may include an evaporator 141, a compressor 142, a condenser 143, and an expansion apparatus 144. The evaporator 141 and the condenser 143 may be provided inside the duct unit 130.

The evaporator 141 may be configured to cool moist steam suctioned into the duct unit 130 from an inside of the washing tank 110 to remove moisture.

The condenser 143 may be spaced apart from a downstream side of the evaporator 141 inside the duct part 130 with respect to the air movement direction, and may be configured to heat the dehumidified air.

However, the evaporator 141 may be accommodated in the heat exchange chamber 145 that is not provide in the duct unit 130 but disposed separately from the duct unit 130. Water may be stored inside the heat exchange chamber 145 such that the water may be configured to transfer heat to the evaporator 141 (FIG. 2).

Referring to FIG. 2, the compressor 142 may be configured to compress and circulate refrigerant. The condenser 143 accommodated in the duct unit 130 is configured to condense high-temperature, high-pressure refrigerant from the compressor 142. The refrigerant of the condenser 143 may exchange heat with air suctioned into the duct unit 130 to release heat to the air so as to heat the air.

The expansion apparatus 144 may be configured with a capillary tube or an electronic expansion valve. The expansion apparatus 144 is to configured to expand refrigerant received from the condenser 143.

The evaporator 141 accommodated in the heat exchange chamber 145 may exchange heat between low-temperature, low-pressure refrigerant received from the expansion apparatus 144 and water stored in the heat exchange chamber 145 to absorb heat from the water to the refrigerant so as to evaporate the refrigerant.

The refrigerant is configured to release heat from the condenser 143 and absorb heat from the evaporator 141 when repeatedly circulated through the compressor 142, the condenser 143, the expansion apparatus 144 and the evaporator 141.

The air heated by the condenser 143 may move from the duct unit 130 to the air passage 122 of the injection arm 120 along the second air circulation pipe 1622 and the third air circulation pipe 1623. A non-return valve 163, for example, a check valve, may be provided in the third air circulation pipe 1623 to prevent air from flowing back.

The non-return valve 163 allows the movement of air from the air circulation pipe 162 to the washing water circulation pipe 150, but on the contrary, prevents the movement of air from the washing water circulation pipe 150 to the air circulation pipe 162.

Referring to FIG. 3, the washing water delivery pipe 151 may be connected between the injection arm 120 and the washing water circulation pipe 150. One side of the washing water circulation pipe 151 may be connected in communication with the washing water circulation pipe 150, and the other side thereof may be connected in communication with the center of the injection arm 120.

An inlet pipe 152 may be disposed at the center of the injection arm 120, and the other side of the washing water delivery pipe 151 may be coupled to the inlet pipe 152 so as to surround the inlet pipe 152 to communicate with the washing water passage 121. Washing water circulated along the washing water circulation pipe 150 may move along the washing water delivery pipe 151 to flow into the washing water passage 121 through the inlet pipe 152.

The inlet pipe 152 of the injection arm 120 may be coupled to be accommodated at the other side of the washing water delivery pipe 151, and the injection arm 120 may be rotatably mounted to the washing water delivery pipe 151. A bearing may be provided between the inlet pipe 152 of the injection arm 120 and the washing water delivery pipe 151 to rotatably support the injection arm 120.

An electric heater (not shown) may be provided inside the sump 111 to heat washing water collected by the sump 111.

The heated washing water may move along the washing water circulation pipe 150 by the circulation pump 154, and move along the washing water delivery pipe 151 from the washing water circulation pipe 150 to flow into the injection arm 120 through the inlet pipe 152 and may be distributed to the plurality of first nozzles 125 along the washing water passage 121.

The plurality of first nozzles 125 may inject the heated washing water into dishes during the washing stroke.

An air inlet port 124 may extend from the center of the partition wall 123 to protrude upward. The air inlet port 124 may be accommodated inside the inlet pipe 152. A lower end of the air inlet 124 is disposed to communicate with the air passage 122.

The third air circulation pipe 1623 may be coupled to the port 124 through the washing water delivery pipe 151. The air inlet port 124 may be inserted into the third air circulation pipe 1623.

The heated air (hot air) may be supplied to the air passage 122 of the injection arm 120 through the third air circulation pipe 1623 and the air inlet port 124.

The plurality of second nozzles 126 may inject hot air flowing into the air passage 122 of the injection arm 120 to dishes.

Figure 4:
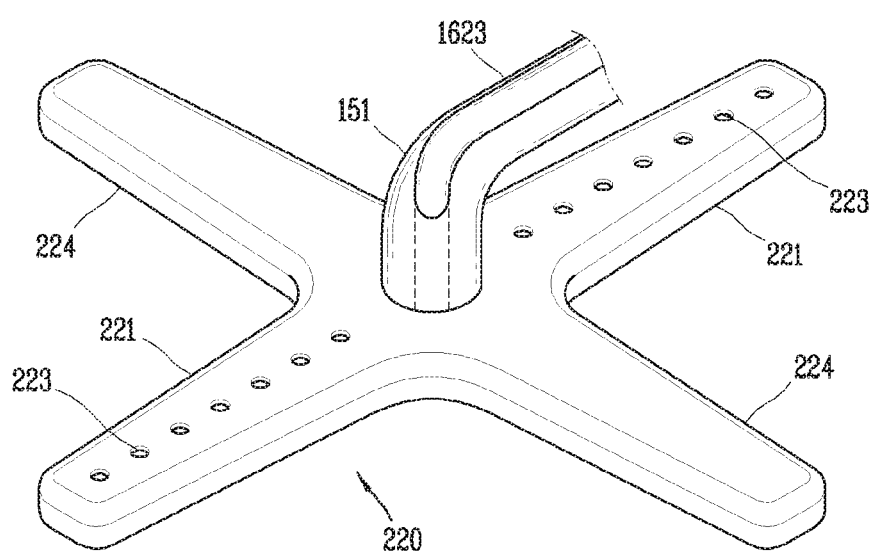
FIG. 4 is a conceptual view showing a state in which the washing water passage and the air passage are separately provided in different injection arm portions as an embodiment different from the injection arm in FIG. 2.
Figure 5:
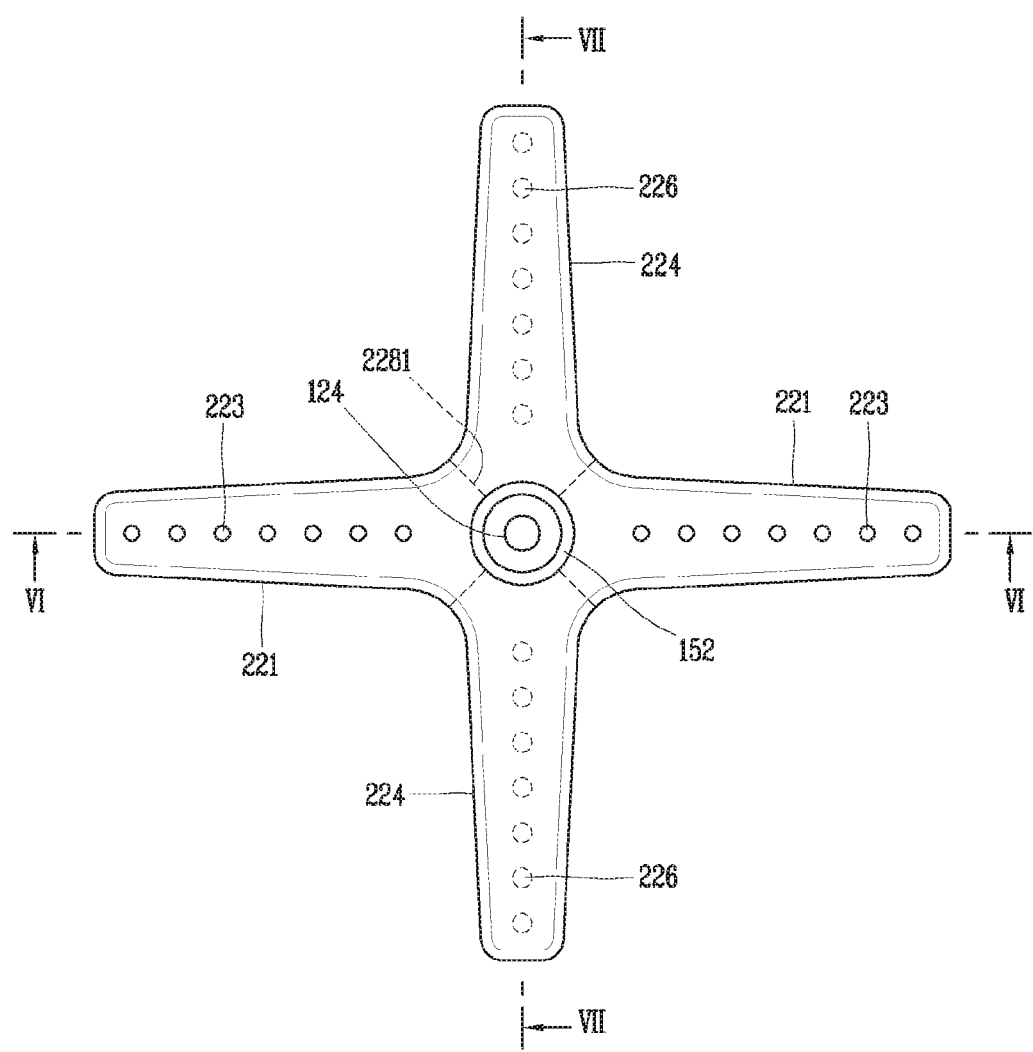
FIG. 5 is a conceptual view showing a state in which the injection arm of FIG. 4 is seen from above.
Figure 6:
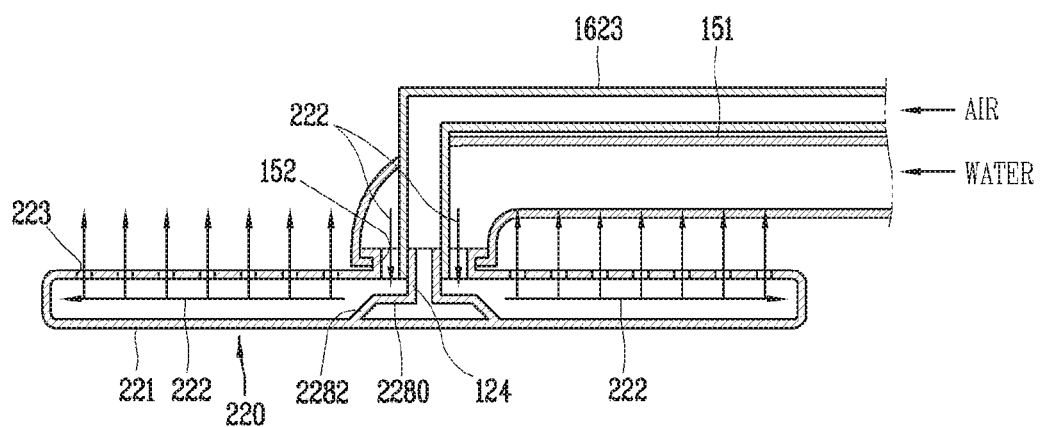
FIG. 6 is a conceptual view showing a structure in which a washing water delivery pipe and a washing water passage are connected by taking a cross section along line VI-VI in FIG. 5.
Figure 7:
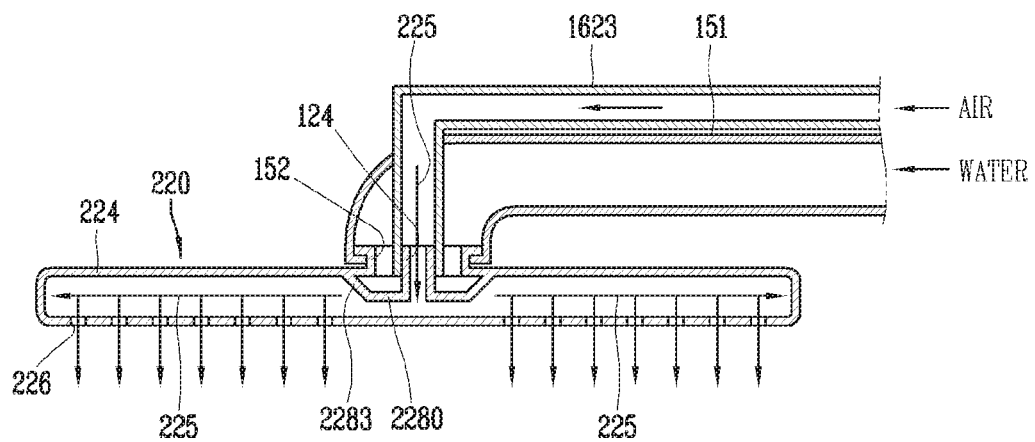
FIG. 7 is a conceptual view showing a state in which an air delivery pipe and an air passage are connected by taking a cross section along line VII-VII in FIG. 5.

FIG. 4 is a conceptual view showing a state in which a washing water passage 222 and an air passage 225 are separately provided in different injection arm portions 221, 224 as an embodiment different from the injection arm 120 in FIG. 2, and FIG. 5 is a conceptual view showing a state in which an injection arm 220 of FIG. 4 is seen from above, and FIG. 6 is a conceptual view showing a structure in which a washing water delivery pipe 151 and a washing water passage 222 are connected by taking a cross section along line VI-VI in FIG. 5, and FIG. 7 is a conceptual view showing a state in which an air delivery pipe and an air passage 225 are connected by taking a cross section along line VII-VII in FIG. 5.

The present embodiment is different from the injection arm 120 of FIG. 2 in that the washing water passage 222 and the air passage 225 are disposed separately inside the different injection arm portions 221, 224.

Each of the plurality of injection arms 220 may be defined in a cross shape.

The injection arm 220 may be configured with a plurality of first injection arm portions 221, a plurality of second injection arm portions 224, and a central connection portion 227.

The first injection arm portion 221 and the second injection arm portion 224 may extend in directions crossing each other.

The plurality of first injection arm portions 221 may be branched from both sides of the central connection portion 227 and may extend radially outward to be disposed on the same line.

The plurality of second injection arm portions 224 may be respectively branched from different both sides of the central connection portion 227 and may extend radially outward to be arranged on the same line with one another. The second injection arm 224 may be spaced apart from the first injection arm 221 at intervals of 90 degrees in a substantially circumferential direction.

The washing water passage 222 may be disposed in the plurality of first injection arm portions 221, and the air passage 225 may be disposed in the plurality of second injection arm portions 224.

A partition wall 228 may be provided inside the central connection portion 227, and the washing water passage 222 and the air passage 225 may be separated by the partition wall 228, and disposed separately in the first injection arm portion 221 and the second injection arm portion 224, respectively.

The partition wall 228 may include a central partition wall portion 2280, a boundary partition wall portion 2228, a first inclined partition wall portion 2228, and a second inclined partition wall portion 2283.

The central partition wall portion 2280 may be horizontally connected inside the central connection portion 227. The air inlet port 124 may protrude upward from an upper surface of the central partition wall portion 2280. The air inlet port 124 may be couple to the air delivery pipe. An edge of the central partition wall portion 2280 may be disposed to overlap with the inlet pipe 152 of the injection arm 220 in a vertical direction.

The boundary partition wall portion 2281 may extend vertically in four directions from the central partition wall portion 2280 between the first injection arm portion 221 and the second injection arm portion 224 to divide an inner space of the central connection portion 227 into which the first injection arm portion 221 and the second injection arm portion 224 are joined to each other, into the washing water passage 222 and the air passage 225.

The first inclined partition wall portion 2282 may extend to be inclined downward from both sides of the central partition wall portion 2280 in a length direction of the first injection arm portion 221 to a lower surface of the first injection arm portion 221, and both end portions of the first inclined partition wall portion 2282 may be connected to a lower portion of two boundary partition wall portions 2281 adjacent in a circumferential direction, and open toward the washing water passage 222 of the first injection arm portion 221 to communicate with the washing water passage 222.

An upper portion of the central partition wall portion 2280 may be connected to communicate with the washing water passage 222.

The second inclined partition wall portion 2283 may extend to be inclined upward from both other sides of the central partition wall portion 2280 in a length direction of the second injection arm portion 224 to an upper surface of the second injection arm portion 224, and both end portions of the second inclined partition wall portion 2283 may be connected to an upper portion of two boundary partition wall portions 2281 adjacent in a circumferential direction, and open toward the air passage 225 of the second injection arm portion 224 to communicate with the air passage 225.

A lower portion of the central partition 2280 may be connected in communication with the air passage 225.

A plurality of first nozzles 223 may be arranged on an upper surface of the plurality of first injection arm portions 221. Each of the plurality of first nozzles 223 may pass through the washing water passage 222 of the first injection arm portion 221 in a thickness direction to communicate therewith. Each of the plurality of first nozzles 223 may include an injection hole, and may be configured to inject washing water.

A plurality of second nozzles 226 may be arranged on a lower surface of the plurality of second injection arm portions 224. Each of the plurality of second nozzles 226 may pass through the air passage 225 of the second injection arm portion 224 in a thickness direction to communicate therewith. Each of the plurality of second nozzles 226 may include an injection hole, and may be configured to inject air.

Although the plurality of second nozzles 226 has been described with reference to the upper injection arm 1202, the position of the second nozzles 226 may also vary according to the position of the injection arm 220.

For example, in case of the top injection arm 1201, a plurality of first nozzles 223 may be arranged on a lower surface of the first injection arm portion 221 to communicate with the washing water passage 222, and a plurality of second nozzles 226 may be arranged on a lower surface of the second injection arm portion 224 to communicate with the air passage 225.

For the lower injection arm 1203, a plurality of first nozzles 223 may be arranged on an upper surface of the first injection arm 221 to communicate with the washing water passage 222, and a plurality of second nozzles 226 may be arranged on an upper surface of the second injection arm 224 to communicate with the air passage 225.

During the washing stroke, washing water may move along the washing water delivery pipe 151 to move to the washing water passage 222 of the first injection arm portion 221 branched from the central connection portion 227 to both sides thereof through the inlet pipe 152.

Washing water may be distributed to the plurality of first nozzles 223 along the washing water passage 222, and injected into dishes through the plurality of first nozzles 223 to wash the dishes.

The controller may control the compressor 142 to operate the compressor 142 during the washing stroke so that refrigerant circulates from the compressor 142 to the condenser 143, the expansion apparatus 144, and the evaporator 141, thereby increasing a refrigerant temperature of the condenser 143 in advance prior to the drying stroke (prior to the operation of the suction fan 131).

During the drying stroke, hot air may move along the air delivery pipe to move to the air passage 225 of the second injection arm portion 224 branched from the central connection portion 227 to both sides thereof through the air inlet port 124.

The hot air may be distributed to the plurality of second nozzles 226 along the air passage 225, and injected to dishes through the plurality of second nozzles 226 to dry the dishes.

Therefore, according to the present disclosure, the condenser 143 and the suction fan 131 may be provided inside the duct unit 130, and the suction fan 131 may suction air from the washing tank 110 into the duct unit 130, and the condenser 143 may heat the suctioned air, thereby saving energy compared to heating air using an electric heater in the related art.

Furthermore, a heat pump may operate prior to a drying stroke to preheat a refrigerant temperature of the condenser 143 to shorten the time for increasing the refrigerant temperature of the condenser 143 during the drying stroke, thereby reducing the drying time of air.

In addition, hot air may be supplied into the injection arm 120 through the air delivery pipe, and injected into dishes through the nozzles of the injection arm 220, and hot air with more heat may be quickly delivered than hot air being supplied to the dishes by natural convection in the related art, thereby improving the drying performance.

Moreover, the washing water passage 121 and the air passage 122 may be separated into upper and lower portions by the partition wall 123 inside one injection arm 120 to divide washing water nozzles and air nozzles separately on the washing water passage 121 and the air passage 122, respectively, and the internal passages of the injection arm may be structurally divided into the washing water passage 121 and the air passage 122 without dividing the washing water passage 121 and the air passage 122 using an additional valve device, thereby simplifying the internal structure of the injection arm 220, and reducing the size of the injection arm 220.

Besides, the air inlet port 124 protruding from the partition wall 123 inside a central portion of the injection arm 120 may be disposed concentrically at an inner side of the washing water inlet pipe 152, but the air delivery pipe may be directly connected to the air inlet port 124 through the washing water delivery pipe 151, and air may be injected onto dishes through the plurality of second nozzles 126 while flowing into the air inlet port 124 along the third air delivery pipe 1623, and moving along the air passage 122. In addition, washing water may be injected onto dishes through the plurality of first nozzles 125 while flowing in through the washing water inlet pipe 152 along the washing water delivery pipe 151, and moving along the washing water passage 121.

Moreover, the injection arm 120 may be rotated by an injection pressure of air injected through second nozzles 126 to generate a circulation flow of air even without an additional circulation fan inside the washing tank 110, thereby actively exchanging heat between hot air and water on dishes.

Besides, the evaporator 141 may be provided at an inlet side of the duct unit 130 connected to the suction port 160 of the washing tank 110, and the evaporator 141 may cool wet steam by absorbing heat from the wet steam inside the washing tank 110, thereby cooling moisture.

Figure 8:
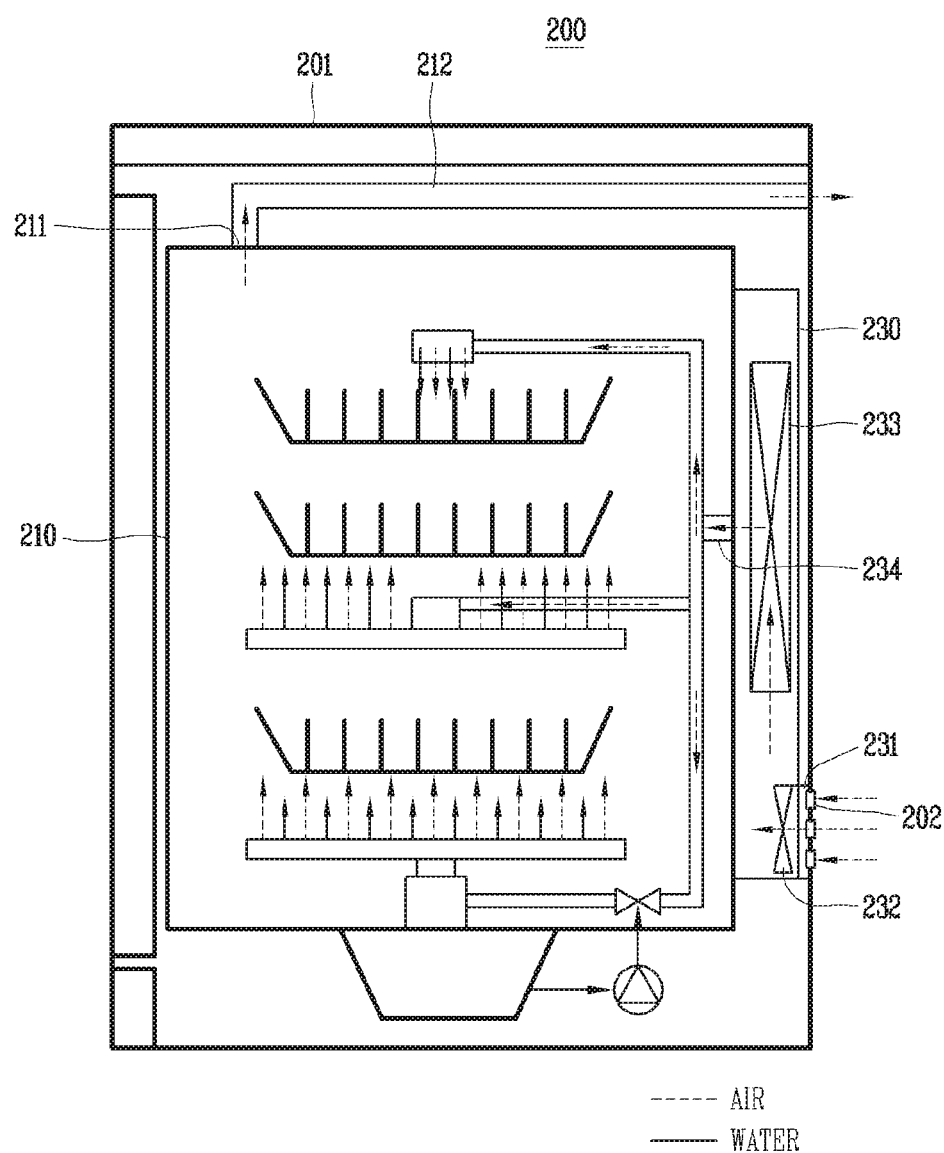
FIG. 8 is a conceptual view showing a dish washer according to a second embodiment of the present disclosure.

FIG. 8 is a conceptual view showing a dish washer 200 according to a second embodiment of the present disclosure.

The present embodiment is a discharge type in which outside air is suctioned into the washing tank 210, and dishes are dried with heated air and the air is discharged to the outside, and it is different from a circulation type of the first embodiment.

For example, an outside air inlet port 202 may be disposed at a rear surface of the cabinet 201 to allow outside air to flow into the cabinet 201.

The duct unit 230 may be provided on a rear surface of the washing tank 210. A suction port 231 may be disposed at a lower portion of the duct unit 230, and a suction fan 232 may be provided in the suction port 231 to suction outside air flowing in through the outside air inlet port 202 into the duct unit 230 through the suction port 231.

An electric heater 233 may be provided inside the duct unit 230 to heat the air suctioned through the suction fan 232.

The heated air may be injected into the washing water circulation pipe through an air injection pipe 234 connected to the washing water circulation pipe. One side of the air injection pipe 234 may be connected in communication with the duct unit 230 through a through hole disposed on a rear surface of the washing tank 210. The other side of the air injection pipe 234 may be connected in communication with the washing water circulation pipe.

Instead of the electric heater 233, the condenser of the heat pump system may be provided inside the duct unit 230, or the condenser and the electric heater 233 may be provided in the duct unit 230.

An exhaust port 211 may be disposed at an upper portion of the washing tank 210. The air of the washing tank may be discharged to the outside through the exhaust passage 212. One side of the exhaust duct 212 may be connected in communication with the exhaust port 211, and the other side of the exhaust duct 212 may be connected in communication with the outside of the cabinet 201.

The evaporator 171 may be provided inside the exhaust duct 212, and air heated in the washing tank 210 may be cooled while passing through the evaporator 171 and then discharged to the outside.

What is claimed is:

1. A dish washer, comprising:
   a washing tank that defines an accommodation space therein configured to receive one or more objects to be washed;
   an injection arm disposed inside the washing tank, the injection arm comprising:
      a plurality of nozzles configured to selectively inject washing water or air to the one or more objects based on an operation process of the dish washer, the operation process comprising a washing operation and a drying operation, and
      a partition wall that partitions an inside of the injection arm into a washing water passage and an air passage;
   a duct unit that defines a passage configured to guide air to the injection arm;
   a suction fan disposed inside the duct unit and configured to generate air flow in the duct unit and supply air to the injection arm; and
   a heat pump system configured to heat air to be supplied to the injection arm, the heat pump system comprising:
      a compressor configured to circulate refrigerant,
      a condenser disposed inside the duct unit and configured to transfer heat from refrigerant compressed in the compressor to air in the duct unit,
      an expansion apparatus configured to expand refrigerant condensed in the condenser, and
      an evaporator configured to evaporate refrigerant received from the expansion apparatus and to transmit refrigerant to the compressor,
   wherein the washing water passage of the injection arm is connected to and in communication with the washing tank that stores the washing water, and
   wherein the air passage of the injection arm is connected to and in communication with the duct unit.

2. The dish washer of claim 1, wherein the partition wall extends horizontally along a length direction of the injection arm, and
   wherein the washing water passage is disposed vertically above the partition wall, and the air passage is disposed vertically below the partition wall.

3. The dish washer of claim 2, wherein the plurality of nozzles comprise:
   a plurality of first nozzles that are arranged at an upper portion of the injection arm, that are configured to communicate with the washing water passage, and that are spaced apart from one another in a first length direction of the injection arm, the plurality of first nozzles being configured to inject washing water in a first injection direction during the washing operation; and
   a plurality of second nozzles that are arranged at a lower portion of the injection arm, that are configured to communicate with the air passage, that are spaced apart from one another in a second length direction of the injection arm, the plurality of second nozzles being configured to inject air in a second injection direction opposite to the first injection direction during the drying operation.

4. The dish washer of claim 1, further comprising:
   a circulation passage configured to guide washing water into the injection arm;
   a circulation pump configured to circulate washing water through the circulation passage;
   a washing water delivery pipe that connects the circulation passage to the washing water passage and that is configured to guide washing water to the washing water passage; and
   an air delivery pipe configured to supply air to the air passage, the air delivery pipe having a first side connected to the duct unit and a second side connected to the air passage through the washing water delivery pipe.

5. The dish washer of claim 4, wherein the injection arm further comprises:
   a washing water inlet pipe disposed at a center of the injection arm and connected to the washing water delivery pipe; and
   an air inlet port that protrudes from a center of the partition wall, that extends through an inside of the washing water inlet pipe, and that is connected to the air delivery pipe.

6. The dish washer of claim 4, wherein the air delivery pipe comprises:
   a first portion that is disposed outside the washing water delivery pipe; and
   a second portion that passes through the washing water delivery pipe and that is inserted into the washing water delivery pipe and connected to the air passage.

7. The dish washer of claim 1, wherein the injection arm comprises:
   a plurality of first injection arms that define portions of the washing water passage and that extend along a first direction;
   a plurality of second injection arms that define portions of the air passage and that extend along a second direction crossing the first direction; and
   a central connection portion that connects first inner end portions of the plurality of first injection arms to second inner portions of the plurality of second injection arms.

8. The dish washer of claim 7, wherein the partition wall comprises:
   a central partition wall portion that horizontally extends to an inside of the central connection portion;
   a plurality of boundary partition wall portions, each of the plurality of boundary partition wall portions extending from the central partition wall portion between one of the first injection arms and one of the second injection arms and partitioning the washing water passage from the air passage;
   a first inclined partition wall portion that is inclined downward from the central partition wall portion to an inner surface of the first injection arms and that is configured to communicate with the washing water passage; and
   a second inclined partition wall portion that is inclined upward from the central partition wall portion to an inner surface of the second injection arms and that is configured to communicate with the air passage.

9. The dish washer of claim 8, further comprising:
a washing water delivery pipe configured to supply washing water to the washing water passage;
an air delivery pipe configured to supply air to the air passage;
a washing water inlet pipe disposed at the central connection portion and connected to the washing water delivery pipe; and
an air inlet port that protrudes from the central partition wall portion to an inner side of the washing water inlet pipe and that is connected to the air delivery pipe.

10. The dish washer of claim 1, wherein the injection arm comprises a plurality of injection arms that are arranged in the washing tank and spaced apart from one another in a vertical direction.

11. The dish washer of claim 10, wherein each of the plurality of injection arms is rotatably mounted to the washing tank and configured be rotated by an injection pressure of washing water or air.

12. The dish washer of claim 1, further comprising an electric heater disposed inside the duct unit and configured to further heat air that is heated by the condenser.

13. The dish washer of claim 1, further comprising:
a heat exchange chamber that accommodates the evaporator, that accommodates water therein, and that is configured to exchange heat between the evaporator and water accommodated in therein.

14. The dish washer of claim 1, wherein the duct unit is disposed vertically above the accommodation space.

15. The dish washer of claim 14, further comprising:
a first air circulation pipe that connects a first end of the duct unit to an suction port defined at an upper surface of the accommodation space; and
a second air circulation pipe that connects a second end of the duct unit to a rear surface of the accommodation space.

16. The dish washer of claim 15, further comprising a third air circulation pipe that connects an end of the second air circulation pipe to a discharge ported defined at the rear surface of the accommodation space.

17. The dish washer of claim 1, wherein the injection arm comprises:
a lower injection arm disposed vertically above a bottom surface of the accommodation space and configured to, based on the operation process of the dish washer, selectively inject air or washing water in an upward direction;
an upper injection arm disposed vertically above the lower injection arm and configured to inject water in the upward direction in the washing operation and air in a downward direction to the lower injection arm in the drying operation; and
a top injection arm disposed vertically above the upper injection arm and configured to, based on the operation process of the dish washer, selectively inject air or washing water in the downward direction to the upper injection arm.

18. The dish washer of claim 17, further comprising a plurality of racks that are disposed inside the washing tank and configured to support the one or more objects,
wherein at least one of the plurality of racks is disposed each of between the lower injection arm and the upper injection arm and between the upper injection arm and the top injection arm.

19. The dish washer of claim 1, wherein the injection arm comprises:
a lower injection arm disposed vertically above a bottom surface of the accommodation space and configured to, based on the operation process of the dish washer, selectively inject air or washing water in an upward direction;
an upper injection arm disposed vertically above the lower injection arm and configured to, based on the operation process of the dish washer, selectively inject air or washing water in the upward direction; and
a top injection arm disposed vertically above the upper injection arm and configured to, based on the operation process of the dish washer, selectively inject air or washing water in a downward direction to the upper injection arm.

20. The dish washer of claim 1, wherein the duct unit is disposed at a rear side of the accommodation space, and
wherein the washing tank defines an exhaust port disposed at an upper side of the accommodation space and configured to discharge air to an outside of the washing tank.

\* \* \* \* \*